(12) United States Patent
McCauley

(10) Patent No.: US 7,032,466 B2
(45) Date of Patent: Apr. 25, 2006

(54) LOAD BEARING DEVICE INCLUDING OVERBOARD INDICATOR

(75) Inventor: John J. McCauley, Winona, MN (US)

(73) Assignee: Peerless Chain, Winona, MN (US)

( * ) Notice: Subject to any disclaimer, the term of this patent is extended or adjusted under 35 U.S.C. 154(b) by 124 days.

(21) Appl. No.: 10/460,903

(22) Filed: Jun. 13, 2003

(65) Prior Publication Data

US 2004/0251056 A1 Dec. 16, 2004

Related U.S. Application Data

(60) Provisional application No. 60/388,881, filed on Jun. 14, 2002.

(51) Int. Cl.
*G01L 1/26* (2006.01)

(52) U.S. Cl. .................. 73/862.53; 177/1; 177/173; 73/862.391; 73/892.642; 116/212; 116/DIG. 34; 59/93

(58) Field of Classification Search ............... 116/212, 116/DIG. 34; 73/862.53, 862.391, 862.642; 177/1, 173; 59/93
See application file for complete search history.

(56) References Cited

U.S. PATENT DOCUMENTS

| | | | |
|---|---|---|---|
| 1,886,784 A | 3/1932 | Boppenhausen | 59/83 |
| 1,904,479 A | 4/1933 | Lashar | 59/35.1 |
| 2,966,878 A | 1/1961 | Feiser, Jr. | 116/212 |
| 3,044,521 A | 7/1962 | St. Pierre | 152/241 |
| 3,077,178 A | 2/1963 | Gordon | 116/114 |
| 3,853,546 A | 12/1974 | Werner et al. | 73/141 |
| 3,885,428 A | 5/1975 | Dalferth | 73/143 |
| 3,905,452 A | 9/1975 | Rieger | 73/143 |
| 3,976,851 A | 8/1976 | Redon | 200/85 |
| 4,094,141 A | 6/1978 | Rehbein | 59/93 |
| 4,249,474 A * | 2/1981 | Archer | 116/212 |
| 4,283,942 A | 8/1981 | Fishfader | 73/862.65 |
| 4,467,598 A | 8/1984 | Wells | 59/78 |
| 4,566,339 A | 1/1986 | Davidson et al. | 73/862.39 |
| 4,605,829 A | 8/1986 | Zacharias | 200/52 |
| 4,796,420 A | 1/1989 | Gueli | 59/93 |
| 4,803,886 A | 2/1989 | May et al. | 73/862.39 |
| 4,977,783 A | 12/1990 | Pratt | 73/862.39 |
| 5,224,388 A | 7/1993 | Pratt | 73/862.632 |
| 5,655,476 A | 8/1997 | Wolter | 116/212 |
| 5,765,891 A | 6/1998 | Fredriksson | 294/82.11 |
| 5,975,786 A | 11/1999 | Chang | 403/78 |
| 6,308,510 B1 | 10/2001 | Christmas | 57/78 |
| 6,774,320 B1 * | 8/2004 | Simons | 177/147 |

* cited by examiner

*Primary Examiner*—Randy W. Gibson
(74) *Attorney, Agent, or Firm*—Moore, Hansen & Sumner; Robert C. Freed

(57) ABSTRACT

A load-bearing device including an overload indicator and a wire form overload indicator are provided for interconnection of load bearing connectors, preferably elongated load bearing connectors, for bearing a load. In preferred embodiments, the load bearing connectors are chains, ropes, wire ropes, cables, straps and the like, preferably chain. The wire form overload indicator preferably includes a wire form quick-link having a first thickness, and first and second elongated sides. The first elongated side preferably includes an interconnectable gap through which connection loops of the load bearing connectors can pass when the interconnectable gap is unconnected. The interconnectable gap includes a connection end and a connectable end, the connecting end having a connector capable of connecting the connecting end to the connectable end to close the gap. The second elongated side preferably has a portion having a diminished thickness as compared to the first thickness. The diminished thickness preferably has a predetermined load bearing capability and is calibrated to reduce the load bearing capability of the methods of making an overload indicator and a load bearing device including an overload indicator are also provided.

31 Claims, 9 Drawing Sheets

LOAD BEARING DEVICE INCLUDING OVERBOARD INDICATOR

This application claims benefit of provisional application 60/388,881 filed Jun. 14, 2002.

BACKGROUND OF THE INVENTION

Chain and other lifting and load-bearing elongated devices such as rope, wire rope, cables, straps and the like are often used intentionally or unintentionally beyond their rated load-bearing capacity or working capacity. When chain and the like are used in this way, and the rated capacity is exceeded, the chain or other lifting or load-bearing elongated devices may fail. When the failure occurs, other damage may be associated with the event and, in certain circumstances, there are attempts to recover damages based upon liability associated with failure of the chain or other load bearing devices. In these circumstances, it would be helpful to determine whether the rated load bearing capacity for the chain or other elongated load bearing device has been exceeded; if so, it is believed that the failure to stay within the rated load bearing capacity will provide important exculpatory evidence for use in defending claims of liability against manufacturers of the chain or other load bearing devices.

For that reason, it is believed that a device, for incorporation into or for use in association with, a chain or other elongated load bearing device would have value in the industry if it was capable of indicating when the rated load bearing capacity or working capacity of the chain or other elongated load bearing device is exceeded. While devices that indicates load exist, these devices are relatively cumbersome and awkward to use or they are so expensive as to make use as an indicator of exceeded load bearing capacity impractical for commercial uses.

While load cells are a possibility, they are relatively expensive and the also require a source of electricity. Incorporation of such an indication device into an elongated load-bearing device such as a rope, chain or other simple load bearing device is believed to be impractical unless the cost of such devices can be significantly reduced.

The present invention provides simple and reliable solutions to these and other problems.

SUMMARY OF THE INVENTION

The present invention provides a load bearing device calibrated to provide an indication of a load borne by the load bearing device that exceeds a load bearing capacity established for the load bearing device. The load bearing device includes first and second load bearing connectors interconnected by an overload indicator. The overload indicator is calibrated to provide an indication of a load borne by the load bearing device that exceeds a load bearing capacity established for the load bearing device. The overload indicator is preferably a modified quick link. The modified quick link preferably includes a strand of wire form material having first and second ends, the first and second ends defining a gap between the respective first and second ends. The preferred modified quick link will further include a disconnectable connector connecting the first and second ends of the strand of wire form material to form a continuous loop, when the connector is connected to each of the respective first and second ends. The strand of wire form material includes a first portion having a first thickness containing a first amount of wire form material in a perpendicular cross-section passing through a length of the strand; the first portion being adjacent to a second portion including a diminished segment having a second amount of wire form material in a perpendicular cross-section passing through a length of the strand which is less than the first amount of wire form material; wherein the diminished segment of the second amount of wire form material is calibrated in such a manner as to establish a projected load, which, when borne by the overload indicator, will create a sufficient force to break the overload indicator proximate the diminished segment.

In preferred embodiments, a load bearing device of the present invention includes a safety loop interconnecting the first and second load bearing connectors so that a secondary load bearing alternative is provided if the overload indicator, which bears the load borne by the respective load bearing connectors, breaks, the safety loop will bear the load unless the load exceeds the load which can be borne by the safety loop. In other embodiments, the overload indicator is marked with a serial number to identify it. In preferred embodiments, a load bearing connector may also be marked with a serial number so that the overload indicator attached to the particular load bearing device made by the manufacturer can be correlated to help manufacturers determine whether the load bearing device has been manipulated by the consumer in any way to hide evidence of an excessive load exceeding the rated capacity of the load bearing device or the overload indicator.

A wire form load indicator is provided for interconnection of load bearing connectors, preferably elongated load bearing connectors, having connection loops for bearing a load. In preferred embodiments, the load bearing connectors are chains, ropes, wire ropes, wires, cables and the like, preferably chain. The wire form overload indicator preferably includes a wire form chain-link having a first thickness, first and second elongated sides and rounded ends. The first elongated side preferably includes an interconnectable gap through which connection loops of the load bearing connectors can pass when the interconnectable gap is unconnected. The interconnectable gap includes a connection end and a connectable end, the connecting end having a connector capable of connecting the connecting end to the connectable end to close the gap. In preferred embodiments, the connectable end is threaded and the connector has reciprocating threads capable of receiving the threaded connectable end in order to interconnect the respective ends, close the gap and complete the loop in the chain-link. The second elongated side preferably has a portion having a diminished thickness as compared to the first thickness. The diminished thickness preferably has a predetermined load bearing capability and is calibrated to reduce the load bearing capability of the overload indicator, as compared to the load bearing capability of a chain length having a consistent thickness equivalent to the first thickness, wherein the predetermined load bearing capability of the diminished thickness is calibrated so that if the overload indicator breaks apart proximate the diminished thickness, such breakage will generally indicate that the load borne by the overload indicator exceeds the predetermined load bearing capability of the diminished thickness.

The present overload indicator has been designed with the objective of providing manufacturers with an indicator capable of providing warning to the user of a load bearing device and post-failure evidence of a load exceeding the rated load bearing capability of a chain or other elongated load bearing devices. The present overload indicator can have a diminished thickness which is calibrated to provide for predetermined breakage when bearing a load in excess of any of a number of rated load bearing capacities for any number of different chains or elongated load bearing devices.

BRIEF DESCRIPTION OF THE DRAWINGS

In the drawings, in which like reference numerals and letters indicate corresponding parts throughout the several views.

FIG. 3 is an enlarged view of a portion of the overload indicator 8a shown in FIG. 2, showing a diminished thickness of the strand 10 of wire form material in the area of the notch 30a;

DETAILED DESCRIPTION OF THE INVENTION

Figure 1:
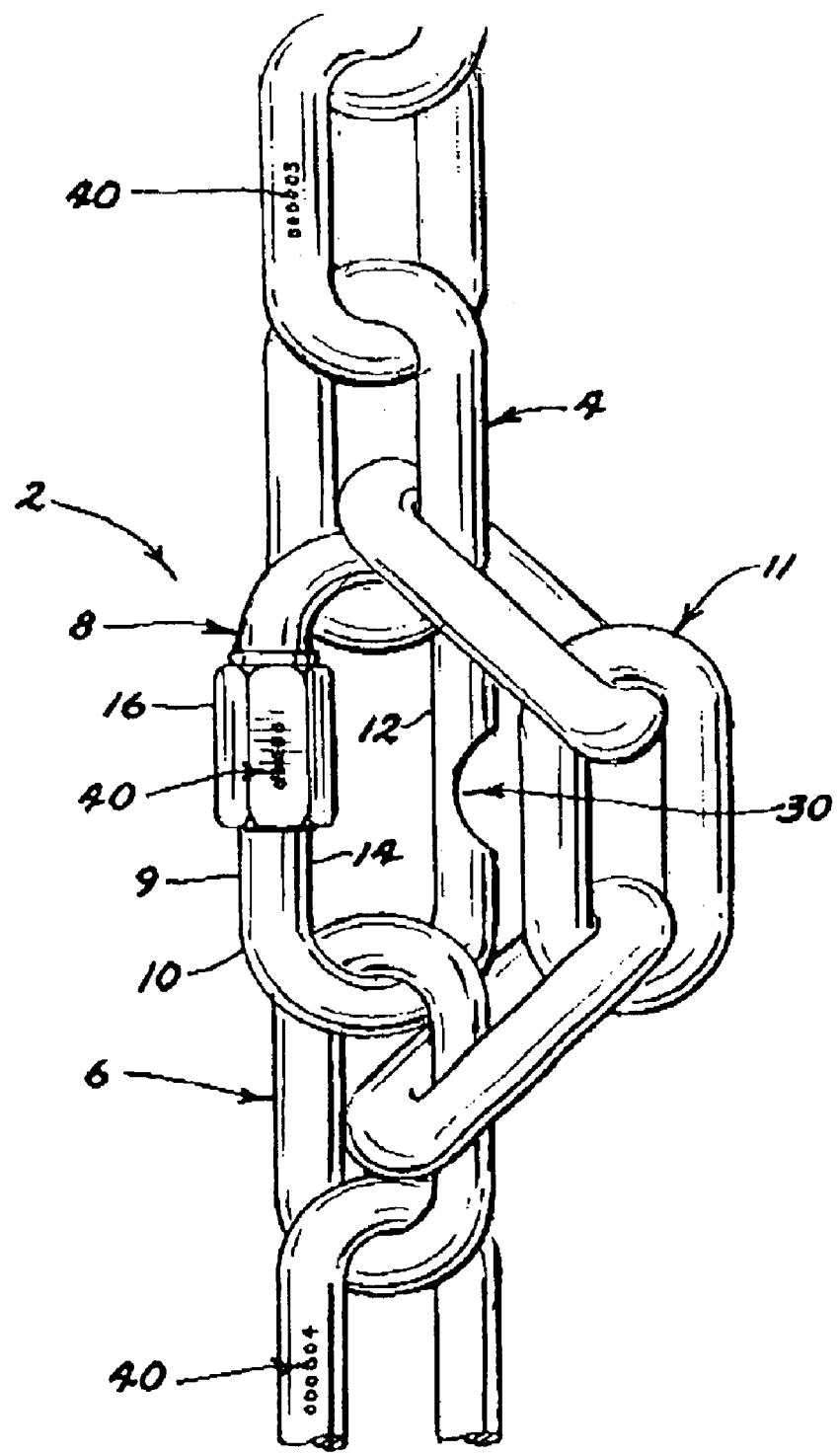
FIG. 1 shows an alternate load bearing device 2 including an overload indicator 8 of the present invention.
Figure 3:
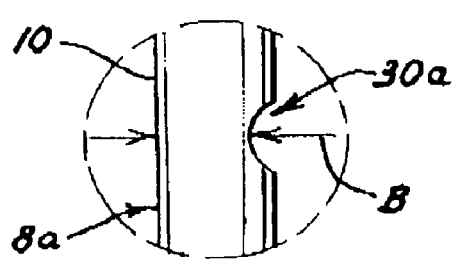
Figure 4:
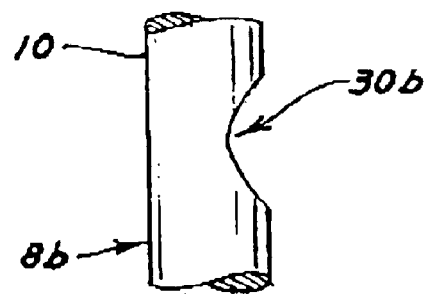
FIGS. 4, 5 and 6 show a series of strands 10 of alternate overload indicators of the type shown in FIG. 2, except that the thickness of the strand 10 at the respective notches 30b, 30c, 30d varies as does the amount of wire form material remaining in the strand 10 in a perpendicular cross-section passing through a length of the strand 10 at the narrowest point created by the respective notches 30b, 30c, 30d.
Figure 2:
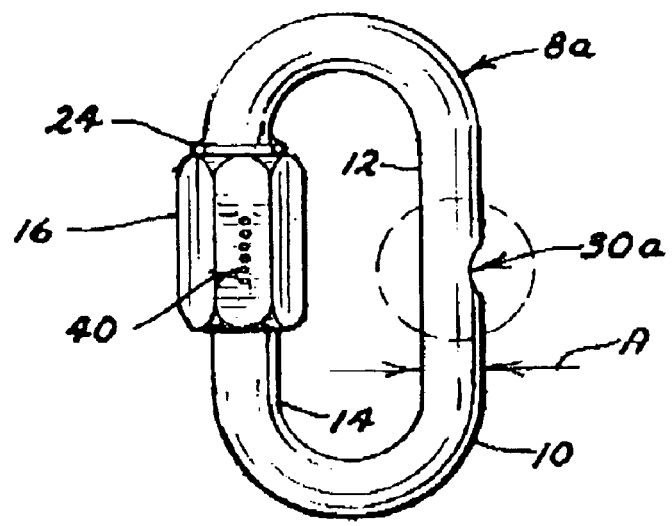
FIG. 2 shows a further alternate overload indicator 8a, similar to that shown in FIG. 1.
Figure 5:
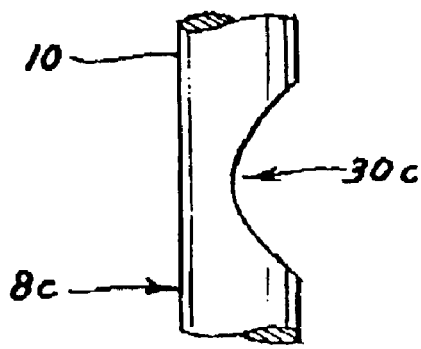
Figure 6:
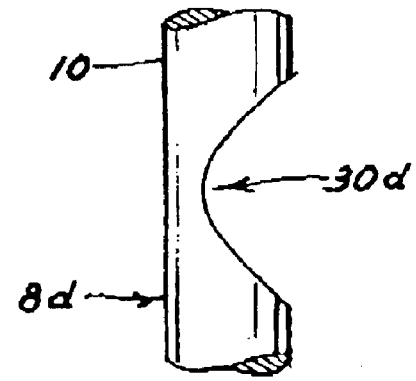
Figure 7:
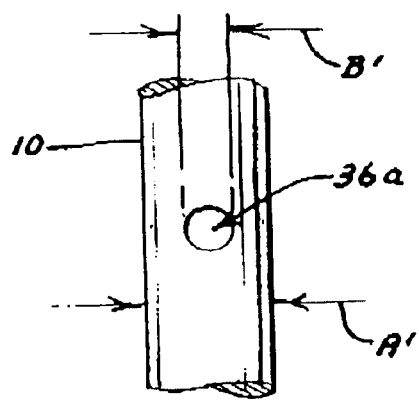
FIGS. 7, 8, 9, 10, 11 and 12 show additional strands 10 of wire form material of overload indicators of the type shown in FIG. 2, except that the amount of wire form material through a perpendicular cross-section passing through a length of the strand is diminished by removing wire form material from the strand by drilling a variable hole 36a, 36b, 36c, 36d, 36e, 36f through the respective strands so that the load bearing capacity of the respective over load indicator 8 will also vary according to the amount of wire form material remaining in a perpendicular cross-section passing through a length of the strand 10 passing through the center of the respective hole.
Figure 8:
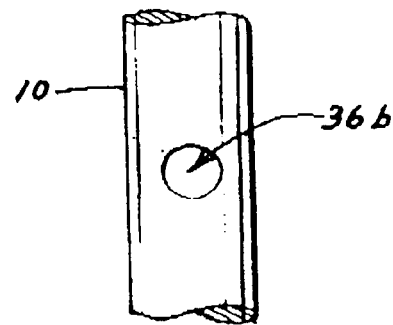
Figure 9:
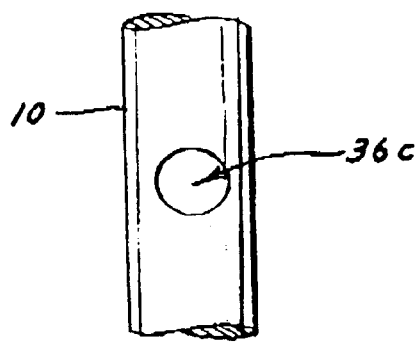
Figure 10:
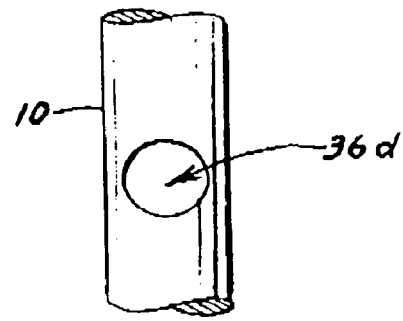
Figure 11:
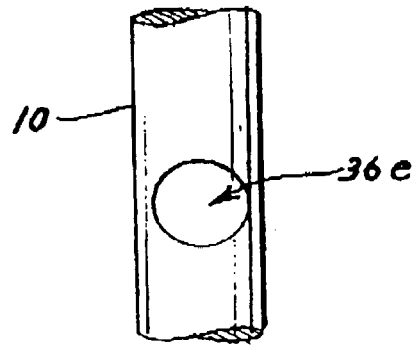
Figure 12:
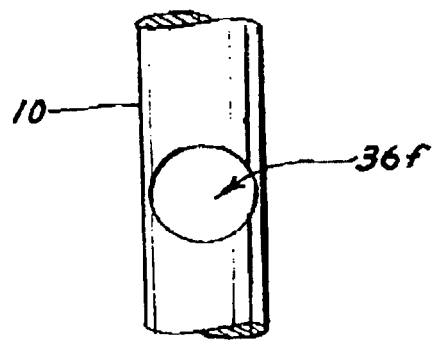

Referring now to FIG. 1, a load bearing device 2 of the present invention having first and second load bearing connectors 4, 6 interconnection by an overload indicator 8 to create a safety loop 11 is shown. The preferred embodiment shown in FIG. 1 is a chain 2 including a modified quick link 9. Referring now also to FIG. 2, the overload indicator 8 of the present invention is preferably made from a modified quick link 9 in which an amount of wire form material in a segment or a portion of a strand 10 of wire form material of the quick line 9 is diminished in one of a number of ways that result in a strand of wire form material that has a segment where the strand is weaker than in other segments of the strand and is therefore projected to break in this segment containing the diminished amount of material. The strand 10 of wire form material, including first and second elongated sides 12, 14, and a connector 16 that is secured to a connectable end 24 of the strand of wire form material.

Referring now also to FIGS. 3–6, it will be appreciated that one of the ways a segment of the strand 10 of wire form material can be diminished to form a modified quick link 9 is to machine one of the elongated sides 12 to form a rounded notch 30a, 30b, 30c, 30d, as shown. The strand 10 has a generally uniform thickness A, which is measurable through a cross-section of the strand 10 generally perpendicular to the length of the elongated side 12. The thickness B of the strand 10 at the notch 30a can also be measured in a similar manner and it will be less than the thickness A of the other segments of the strand 10. In preferred embodiments, the thickness of the notch 30 will be less than about 70% of the thickness of the other segments of the strand 10.

Referring now also to FIGS. 7–12, such an elongated side 12 may also be drilled out, preferably in the center of the wire to form openings or holes 36a, 36b, 36c, 36d, 36e, 36f. The thickness A' of the strand 10 is generally measured across a cross-section of the strand 10 perpendicular to the length of the elongated side 12 of the strand 10. The thickness B' of the remaining material on either side of the hole or opening 36 is also measured in a similar manner.

Figure 13:
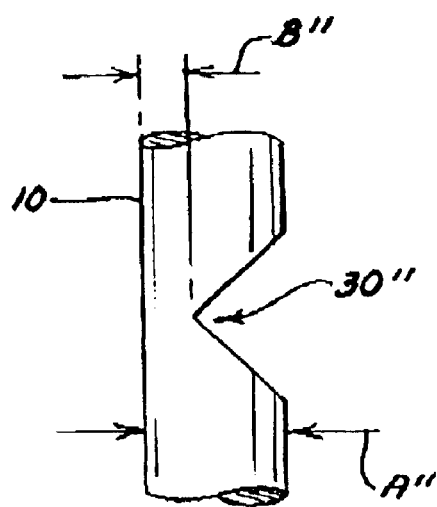
FIG. 13 shows a portion of a strand 10 of an alternate overload indicator having an alternate notch 30' consisting of a v-cut.
Figure 14:
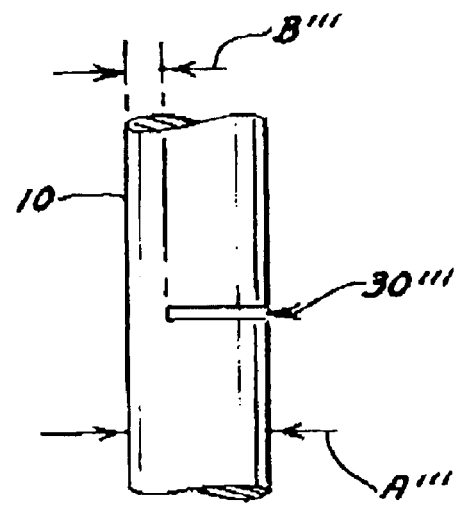
FIG. 14 shows a portion of a strand 10 of an alternate overload indicator having an alternate notch 30" consisting of a saw-cut.

In yet further embodiment, further notches in the elongated sides 12 will also diminish the amount of wire form material in the diminished segment of the strand 10. Referring now also to FIG. 13 and 14, a V-shaped notch 30" made by a machining tool such as a mini-broach or the like may also be included (see FIG. 13), as can a saw-cut notch 30'" made by a saw blade (see FIG. 14). The thickness B", B'" of the respective notches 30", 30'" and the thickness A", A'" of the strand 10' in each case are measured in the same manner as discussed above in relation to the overload indicators 8a–8d discussed in relation to FIGS. 2–6. It will be appreciated that other ways of reducing the material present in the strand 10 of wire form material may be employed so long as the amount of wire form material is reduced as compared to an adjacent segment of the strand 10. While machining and cutting may be used, it will also be appreciated that the strand of wire form material could be formed to have a diminished amount of wire form material in one segment as compared with the other segments that had a greater amount of material. In this way, a diminished segment could be created without machining or cutting the strand in any way. Depending either on the amount of material present, the thickness of the remaining material, or any other measure of diminished material presence that correlates with break strength, it is believed that the modified quick links 9 or overload indicators 8 can be calibrated to provide an indication of a load borne by the load bearing device 2 that exceeds a load bearing capacity established for the load bearing device 2.

Figure 15:
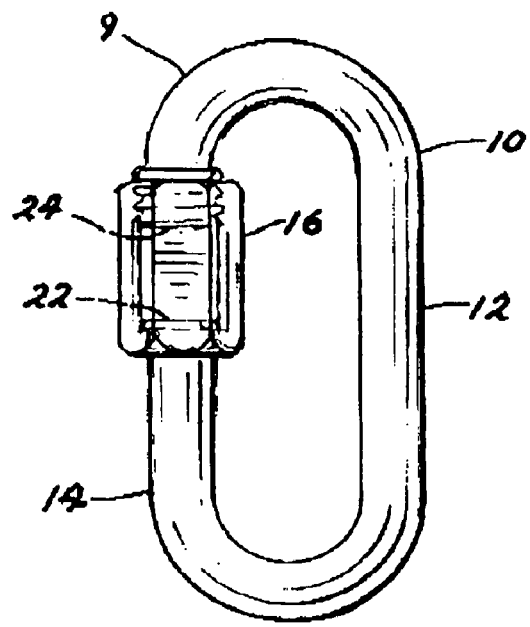
FIGS. 15 and 16 show a prior art quick link 9 shown in a connected configuration in FIG. 15 and an unconnected configuration in FIG. 16.
Figure 16:
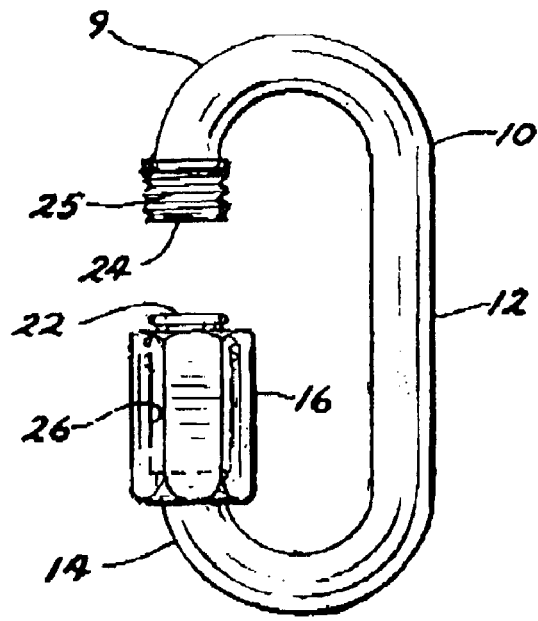

Referring now also to FIGS. 15 and 16, the overload indicator 8 of the present invention is preferably made from a quick line 9 of the type shown in FIGS. 15 and 16. Quick links of this type are commercially available from Mizumoto Machine Manufacturing Co., Ltd., Himeji-city, Japan and elsewhere. Although quick lines of various kinds are available in the market place, the strands of wire form material in such products are generally made from SAE 1008 steel containing 0.08% carbon content. The quick link 9 has a strand 10 of wire form material, including first and second elongated sides 12, 14, and a connector 16 that is secured to a connecting end 22 of the strand of wire form material. At the other end of the strand 10 of the quick link 9 is a connectable end 24 including a threaded exterior surface 25. The connecting end 22 and the connectable end 24 define a gap in the strand 10 which is bridged when the connector 16 is secured to the connectable end 24 by securing reciprocating threads 26 of the connector 16 to the threaded exterior surface 15 of the connectable end 24.

Referring now also to FIGS. 2–6, the alternate load bearing device of the present invention may include any one of a series of overload indicators, 8a, 8b, 8c, 8d in which the strand 10 of the quick link 9 is diminished by creating a notch 30a, 30b, 30c, 30d in the strand 10 to diminish the thickness of the strand and diminish the amount of wire form material in a perpendicular cross-section passing through a length of the strand through the narrowest portion of the strand 10 at the respective notch 30a, 30b, 30c, 30d. This narrowing of the thickness of the strand, or, in an alternate embodiment discussed below, the reduction in the amount of wire form material in the strand 10, is believed to reduce the strength of the strand 10 at the point of this narrowing or reduction of material so as to create a weakness in the strand 10 where the strand 10 will break in a predictable manner, when exposed to loads which exceed the load bearing capacity of the strand 10. This load bearing capacity can be calibrated as discussed below in order to provide an overload indicator 8 which will indicate that an established load bearing capacity for a particular load bearing device 2 including an overload indicator 8 has been exceeded when such a load bearing device 2 is exposed to an excessive load.

Although the load bearing device shown in FIG. 1 is essentially a chain having a series of chain links and an overload indicator 8 of the present invention, it will be appreciated that the load bearing connectors 4, 6 may also be made of other load bearing connectors such as cables, straps, ropes, wire ropes and the like that are interconnected with the overload indicator of the present invention. Although not required, the safety loop 11 shown in FIG. 1 is preferred. Any number of equivalent safety loops may be used in association with alternate load bearing devices including safety loops made from ropes, wire ropes, cables, straps and the like that are secured to the respective load bearing connectors to secure them if the overload indicator is exposed to an excessive load and subsequently breaks following such exposure.

Referring now also to FIGS. 13 and 14, the notch 30 of the present invention may be a narrowing in the strand 10 of a quick link created by a grinding device of one type or another or by any other type of device that will remove material to either create a narrowing in the strand or simply reduce the amount of wire form material in a certain thickness of the strand 10 of a quick link. In FIGS. 13 and 14, two somewhat different notches, 30' and 30", are shown. These notches are a v-cut notch 30' and a saw-cut notch 30". In each case, the amount of material at the narrowest point of the respective notch is reduced, thereby reducing the breaking force required to break the strand at the respective notch. In the present application, the term "notch" means a narrowing in a strand of wire form material. The narrowing may be created either by cutting away existing material in a pre-formed strand of wire form material, or, alternately, by creating a strand of wire form material having a narrowing.

Referring now also to FIGS. 7–12, the overload indicator 8 of the present invention may also include a segment of a strand 10 of wire form material in which the amount of wire form material in a horizontal plane passing through the strand 10 of wire form material is reduced by drilling a hole 36 or otherwise creating an opening 36 in the strand 10 of wire form material. In this way, the amount of wire form material in this particular strand of wire form material is reduced so as to reduce the breaking force required to break the strand at this particular segment. It will be appreciated that a series of openings or holes, having a variety of shapes, may be created in a strand of wire form material to reduce the amount of material in the strand, thereby reducing the breaking force required to break the strand. In each case, it is believed that the amount of force required to break the strand 10 at the point at which the amount of wire form material in the strand is reduced can be calibrated so as to create a predictable breaking force that will break the strand when such a force is borne by the strand. In this way, a series of overload indicators 8 may be created, calibrated and used to provide an indication of the exposure of a load bearing device to a load which exceeds an established load bearing capacity for the particular load bearing device 2. It will be appreciated, that a load bearing device 2 including an overload indicator, will provide an indication to manufacturers when their load bearing devices have been misused by purchasers. In particular, if a load bearing device having a specific load bearing rating is used and exposed to a load greater than the established load bearing capacity for which the load bearing device is rated, the overload indicator will break, providing clear evidence of its exposure to a load exceeding the established load bearing capacity.

As noted in FIGS. 1 and 2, the overload indicator may also include a serial number 40 which is etched, stamped or otherwise imprinted on the load bearing device. The same serial number may also be secured to the respective load bearing connectors 4, 6, so that upon failure of the overload indicator, efforts to replace the overload indicator with a different overload indicator can be monitored.

As indicated above, the overload indicator 8 will have a serial number 40 to identify the particular overload indicator 8. In preferred embodiments, the load bearing connector may also have a serial number 40 so that the load bearing device may be identified and correlated with the particular overload indicator 8 interconnecting the respective load bearing connectors of the load bearing device with the overload indicator actually incorporated in the device by the manufacturer. It will be appreciated that utilizing these serial numbers will provide manufacturers with information to help control tampering by users following exposure of a load bearing device 2 or overload indicator 8 to a load which exceeds the working capacity or rated capacity set for the particular indicator 8 or device 2.

In preferred embodiments, the strand 10 of wire form material used to make the quick link 9 for modification to be an overload indicator 8, will be made of steel containing at least about 0.12% carbon, preferably at least about 0.16% carbon, most preferably about 0.22% carbon and sufficiently heat treated to raise the tensile strength of the overload indicator 8 to that sufficient to meet tensile strength requirements for inclusion in an overhead chain load bearing device in the United States of America. It will be appreciated that heat treating is an art that is well known and that those of skill in the art can achieve the goal they wish to achieve when they are asked to heat treat a higher carbon steel of the type discussed. Heat treating generally involves heating the steel to a temperature of at least about 16000 degrees F. or until the steel is "red hot". The heat is then quickly dissipated, by placing the steel in a cooler liquid to "quench" the heat. The steel is then tempered by heating the steel again, however, each steel is treated somewhat different, and many approaches may be taken, most of which are well known in the art.

The present overload indicator 8 preferably includes first and second elongated sides 12, 14 and a connector 16, interconnected with a connecting end 22 of the overload indicator, preferably for threadable connection to a connectable end 24 of the overload indicator to close a gap (not shown), which exists between the connecting end 22 and the connectable end 24 of the overload indicator 8. In preferred embodiments, the overload indicator will have a notch 30 in the second elongated side that creates a narrowing in the wire formed material which reduces the strength of the material and the load bearing capacity of the material at that point. The amount of material that is removed in creating the notch may be varied and the amount of material which remains will correlate with the amount of the load bearing capacity of the preferred overload indicator.

In alternate embodiments of the present invention, the overload indicator (not shown) may be a ordinary welded chain link, as opposed to a quick link, diminished in the respective manners discussed herein. The step of diminishing the amount of material in a portion of the strand of wire from material may occur either before or after the chain link is welded our otherwise secured within the load bearing device.

EXAMPLE 1

Figure 17A:
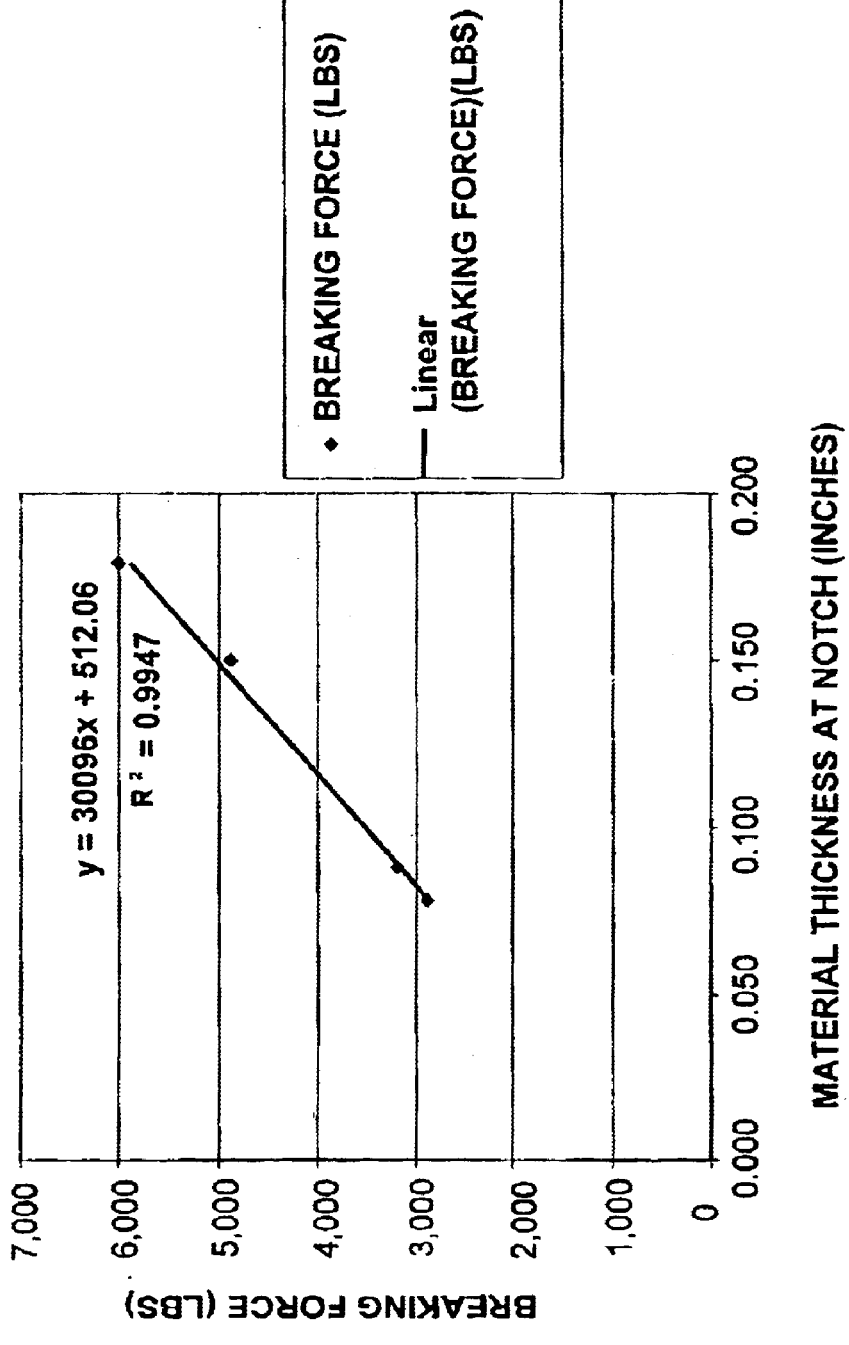
FIGS. 17 A, B, C and D show graphical representations of the data reported in Tables 1, 2, 3 and 4, respectively, and FIG. 17 E provides a further graphical representation of data reported in Table 3.
Figure 17B:
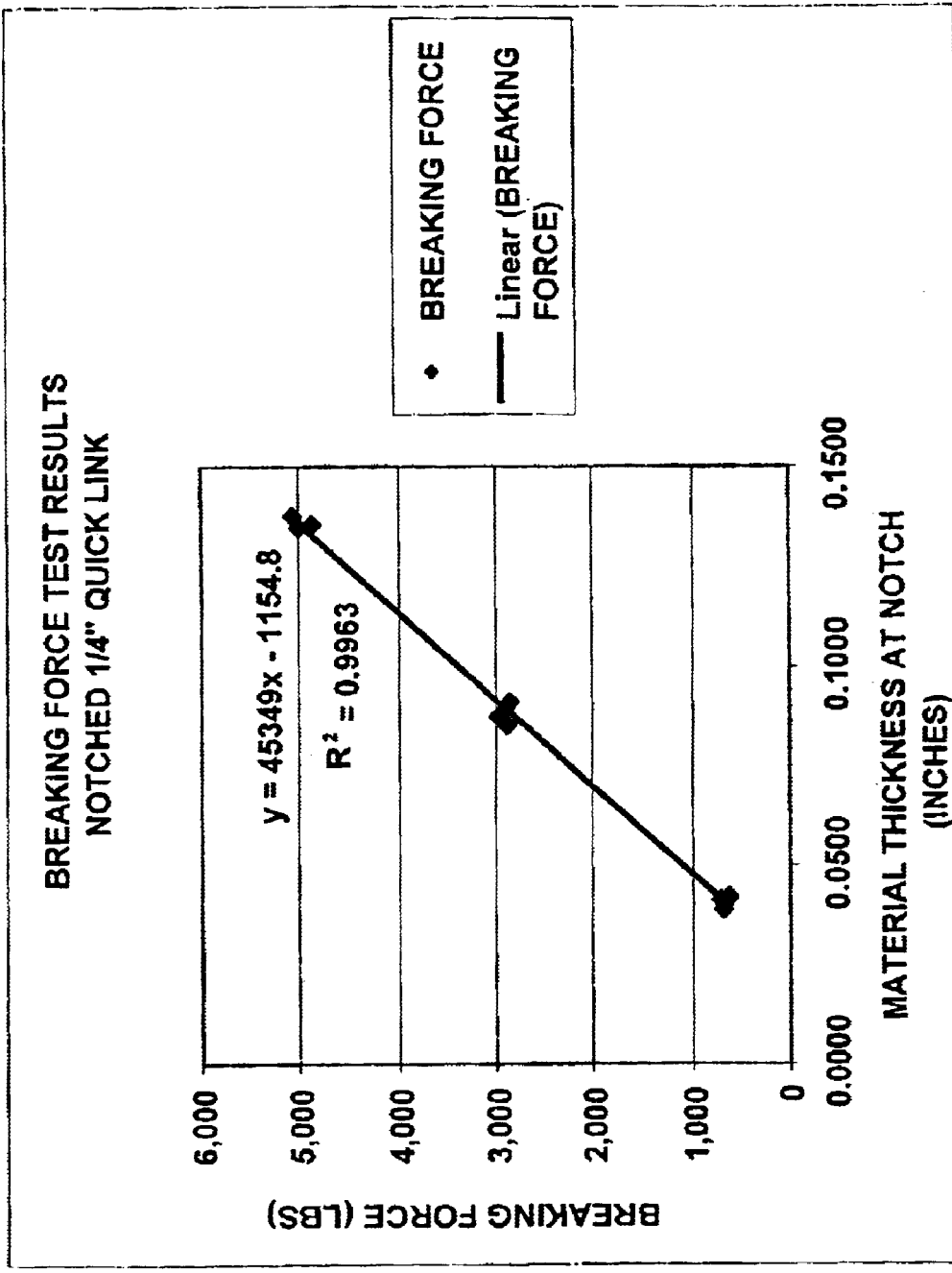
Figure 17C:
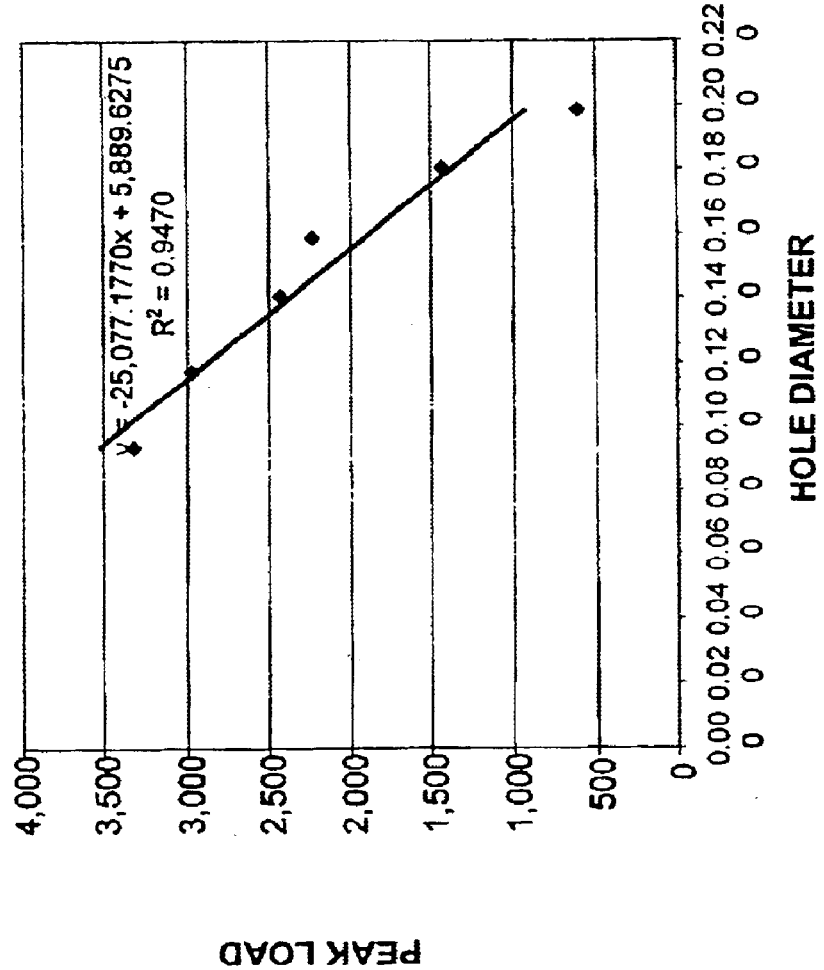
Figure 17D:
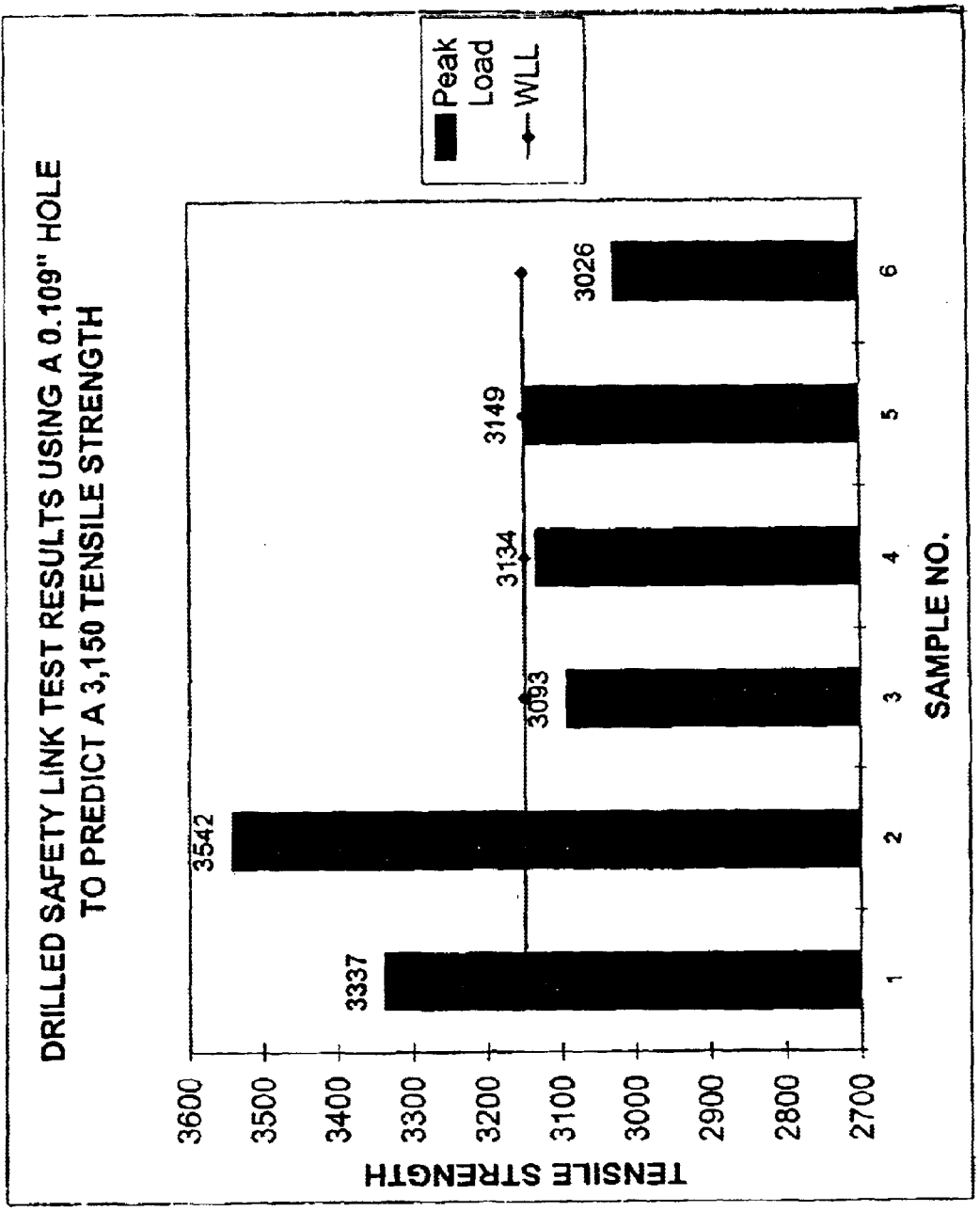
Figure 17E:
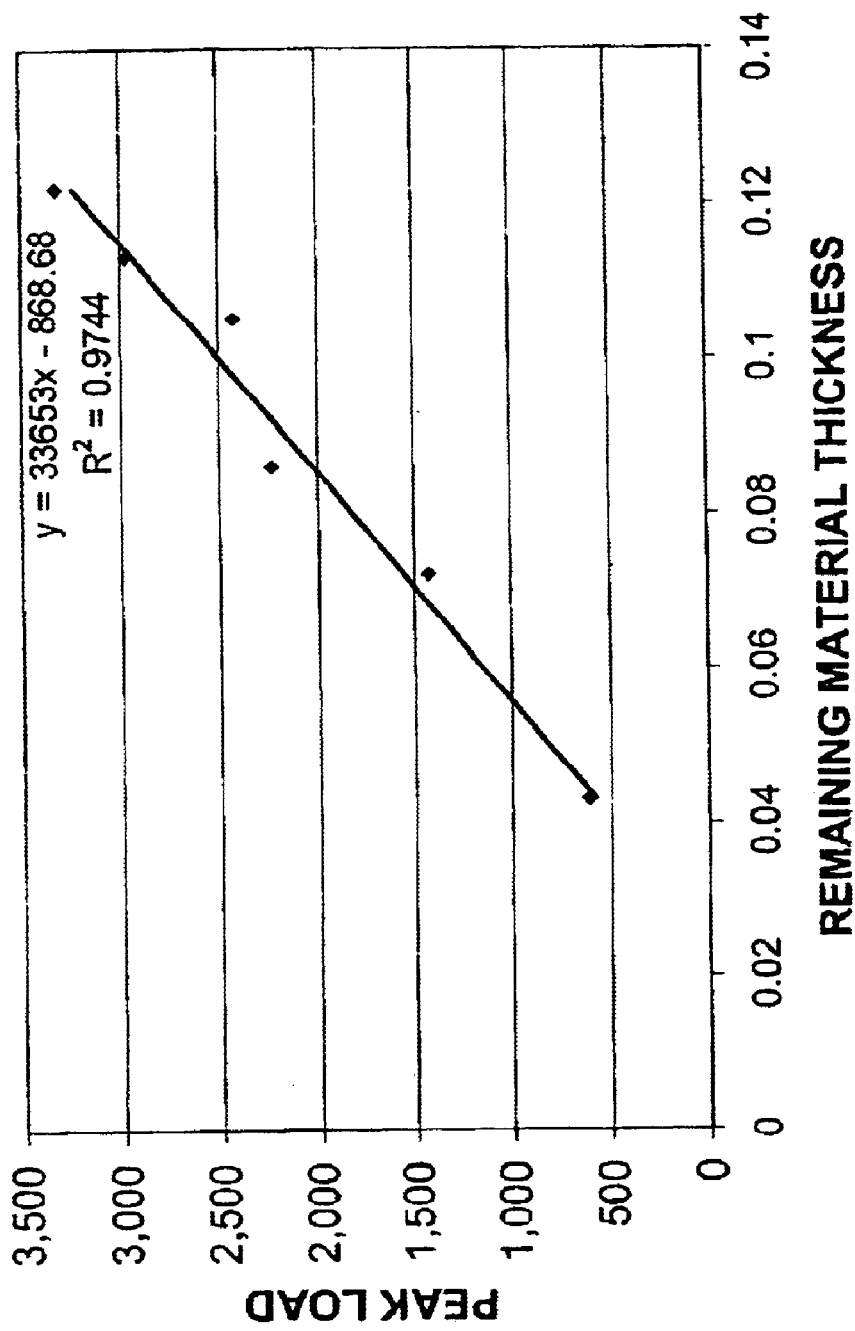

Quarter-inch commercially available quick links made from low carbon steel (SAE 1008 STEEL or the equivalent) were machined to create notches of various depths generally in the center of the side of the quick link opposite the connector to form overload indicators of the present invention. These modified quick link samples were incorporated into load bearing devices by connecting them to a 7MM grade 70 chain having a rated load bearing capacity of 3,150 pounds. The overload indicators were connected to the chain to become a load bearing component between two connecting links of separate load bearing connectors separated by three links of the chain that no longer bore the load and became the safety loop connected to the two connecting links of the load bearing connectors. The thickness of the remaining wire form material at the narrowest point at the bottom of the notch was measured using an optical comparator. The load bearing devices made with each of the respective overload indicator samples was tested to determine its peak load by placing a continuously increasing load upon each load bearing sample using a Satec Tensile Strength Tester. The data for breaking strength was plotted against remaining material thickness at the notch to generate a best fit line showing the relationship between break strength and remaining material thickness at the notch. The correlation coefficient for the line relative to the data was determined to be 0.9947 which was believed to be acceptable. The data is reported in Table 1 and a plot of the data reported in Table 1 is shown in FIG. 17A.

TABLE 1

| Test No. | Material Thickness at Notch (inches) | Material Thickness as a % of Original Diameter | Break Strength (breaking force) (LBS) | Break Type |
|---|---|---|---|---|
| 1 | 0.179 | 76% | 6004 | End Shear |
| 2 | 0.150 | 64% | 4877 | Notch Shear |
| 3 | 0.088 | 37% | 3180 | Notch Shear |
| 4 | 0.078 | 33% | 2885 | Notch Shear |

EXAMPLE 2

Quarter-inch commercially available quick links made from SAE 1008 steel were cut with a saw blade to create notches of various depths and to diminish the wire form material generally in the center of the side of the quick link opposite the connector to form overload indicators of the present invention. These modified quick link samples were incorporated into load bearing devices by connecting them to a 7MM grade 70 chain having a rated load bearing capacity of 3,150 pounds. The overload indicators were connected to the chain to become a load bearing component between two connecting links of separate load bearing connectors separated by three links of the chain that no longer bore the load and became the safety loop connected to the two connecting links of the load bearing connectors. The thickness of the remaining wire form material at the narrowest point at the bottom of the notch was measured using an optical comparator. The load bearing devices made with each of the respective overload indicator samples was tested to determine its peak load by placing a continuously increasing load upon each load bearing sample using a Satec Tensile Strength Tester. The data for breaking strength was plotted against remaining material thickness at the notch to generate a best fit line showing the relationship between break strength and remaining material thickness at the notch. The correlation coefficient for the line relative to the data was determined to be 0.9963 which was believed to be acceptable. The data is reported in Table 2 and a plot of the data reported in Table 2 is shown in FIG. 17 B. it is believed that correlation coefficient will begin to fall off when sample overload indicators have notches were less than about 25% of the original material thickness is diminished.

TABLE 2

¼" QUICK LINK TESTING

| n | NOTCH WIDTH | NOTCH DEPTH | NOTCH RADIUS | ORIGINAL WIRE DIA. | MAT'L THICKNESS AT NOTCH | BREAKING FORCE | % OF ORIGINAL MAT'L THICKNESS |
|---|---|---|---|---|---|---|---|
| 1 | 0.1589 | 0.1058 | 0.0324 | 0.2402 | 0.1344 | 5,009 | 56% |
| 2 | 0.1591 | 0.1026 | 0.0318 | 0.2402 | 0.1376 | 5,061 | 57% |
| 3 | 0.1623 | 0.1048 | 0.0319 | 0.2401 | 0.1353 | 4,866 | 58% |
| 4 | 0.2147 | 0.1527 | 0.0318 | 0.2405 | 0.0878 | 2,962 | 37% |
| 5 | 0.2156 | 0.1494 | 0.0304 | 0.2404 | 0.0910 | 2,847 | 38% |
| 6 | 0.2169 | 0.1552 | 0.0285 | 0.2408 | 0.0856 | 2,883 | 36% |
| 7 | 0.2737 | 0.2013 | 0.0391 | 0.2401 | 0.0388 | 672 | 16% |
| 8 | 0.2725 | 0.1987 | 0.0353 | 0.2400 | 0.0413 | 700 | 17% |
| 9 | 0.2739 | 0.1980 | 0.0351 | 0.2401 | 0.0421 | 609 | 18% |

EXAMPLE 3

Commercially available quarter-inch quick links made from SAE 1008 steel were drilled generally through the center of the wire opposite the connector on the quick link with a series of drill bits of various sizes to determine a predicted hole size (diameter) that would result in a break at a project load of 3,150 lbs. The actual hole size and the amount of remaining wire form material remaining on each side of the hole or opening were measured using an optical comparator. The peak load for each drilled quick link was measured by placing a continuously increasing load upon each drilled link sample using a Satec Tensile Strength Tester. The data for breaking strength was plotted against hole size to generate a best fit line showing the relationship between break strength and hole size. The correlation coefficient for the line relative to the data was determined to be 0.9470 which was believed to be acceptable. The equation for the line was y (break strength)=25,077x (hole diameter)+ 5889.6. This equation was used to determine a hole size projected to achieve a 3,150 lbs. peak load. The data is reported in Table 3 and a plot of the data reported in Table 3 is shown in FIG. 17 C. The projected hole size for a 3,150 lbs, load bearing capacity was a hole or opening having a 0.1092 inch diameter. It is generally believed that a 7/64ths inch drill bit will generally generate a hole having a diameter of 0.1094 inch. In order to confirm this result, six quarter-inch quick links made from SAE 1008 steel were drilled generally through the center of the wire opposite the connector on the quick link with a 7/64ths inch drill bit. The peak load for each of these samples was measured by placing a continuously increasing load upon each drilled link sample using a Satec Tensile Strength Tester as reported above. The data from these measurements is reported in Table 4 below and presented graphically in the bar graph shown in FIG. 17D. The average of the six peak load measurements is within 2.016% of the target peak load. Peak load is also plotted against remaining material thickness, each reported in Table 3, in the graph shown in FIG. 17 E.

TABLE 3

| Size of Drill Bit | Actual Hole I.D. | Remaining Mat'l 2 sides | Peak Load |
| --- | --- | --- | --- |
| .100 DIA | 0.094 | 0.122 | 3323 |
| .120 DIA | 0.118 | 0.113 | 2973 |
| .140 DIA | 0.141 | 0.105 | 2425 |
| .160 DIA | 0.159 | 0.086 | 2237 |
| .180 DIA | 0.181 | 0.072 | 1425 |
| .200 DIA | 0.198 | 0.043 | 611 |

TABLE 4

| Sample | Specimen Gage Length | Peak Load | Target Working Load Limit (WLL) | Maximum Elongation | Specimen Identification | Size of Wire |
| --- | --- | --- | --- | --- | --- | --- |
| NO 1 | 1.83 | 3,337 | 3.150 | 36.27 | HOLE BREAK | 1/4" |
| NO 1 | 1.83 | 3,542 | 3.150 | 38.04 | HOLE BREAK | 1/4" |
| NO 3 | 1.83 | 3,093 | 3.150 | 37.22 | HOLE BREAK | 1/4" |
| NO 4 | 1.83 | 3,134 | 3.150 | 37.64 | HOLE BREAK | 1/4" |
| NO 5 | 1.83 | 3,149 | 3.150 | 35.22 | HOLE BREAK | 1/4" |
| NO 6 | 1.83 | 3,026 | 3.150 | 49.22 | HOLE BREAK | 1/4" |
| AVERAGE: | | 3,214 | | | | |
| ST DEV: | | 191.5 | | | | |

A load measuring device connected in-line to a segment of chain that provides a lasting, visual indication that the rated capacity of the chain has been exceeded. It is connected directly to what would otherwise be adjacent links of a chain; or between a chain and a chain attachment, such as a clevis hook. The overload indicating link or overload indicator is marked or labeled with the rate capacity of the chain.

People using chain for vehicle recovery, towing, logging, lifting and other load bearing applications often do not known when they are overloading, or exceeding the rated capacity, of the chain. Overloading a chain has often resulted in personal injury or property damage if the unaware and uninformed user continues to load the chain to its breaking point, due to industry and government standards for safety factors in the design and manufacture of chain, the yield point and ultimate tensile strength of an undamaged chain are both well above the rated capacity, or working load limit, of the chain. There is therefore, no visible indication to a user, such as elongation of the chain links, that the chain has been overloaded until the overload is in excess of the yield point and that much closer to ultimate failure. A related problem is that someone using a chain that could have been used by others does not typically known the condition or history of the chain, or the risk of using it. Various devices are available today to monitor the load on a chain. They are, however, frequently not used due to such drawbacks as cost, availability, complexity, and the need for signal processing equipment.

One objective of the present invention is to provide a versatile, rugged, load bearing, self contained warning device that presents a reliable and lasting visual signal, readily visible to a current or subsequent user, to indicate a chain has been overloaded beyond its rated capacity.

In a preferred embodiment shown in FIG. 13, the notch 30" is a V-cut notch that is cut at a 45% angle to the surface of the elongated side 12 of strand 10 running parallel to the length of the strand 10.

It is to be understood that even though numerous characteristics and advantages of the various embodiments of the present invention have been set forth in the foregoing description, together with details of the manufacture of load bearing devices and overload indicators of the present invention and the various steps of the method of making a load bearing devices, but that this disclosure is illustrative only and changes may be made in detail, especially in matters of additional component and/or steps in the method of making the various embodiments of the present invention, all within the principles of the prevent invention, to the full extent indicated by the broad meaning of the terms in which the appended claims are expressed.

What is claimed is:

1. A load bearing device calibrated to provide an indication of a load borne by the load bearing device that exceeds a load bearing capacity established for the load bearing device, the load bearing device comprising:

first and second load bearing connectors interconnected by an overload indicator; the overload indicator being calibrated to provide an indication of a load borne by the load bearing device that exceeds a load bearing capacity established for the load bearing device; the overload indicator including a quick link; the quick link including a strand of wire form material having first and second ends, the first and second ends defining a gap between the respective first and second ends; the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion; the second portion including a diminished segment having a second amount of wire form material in a perpendicular cross-section passing through a length of the strand which is less than the first amount of wire form material, wherein the second amount of wire form material is calibrated in such a manner as to establish a projected load, which, when borne by the overload indicator, will create a sufficient force to break the overload indicator proximate the diminished segment.

2. The load bearing device of claim 1, further comprising a safety loop interconnecting the first and second load being connectors.

3. The load bearing device of claim 1, wherein the overload indicator has a serial number affixed to identify the overload indicator.

4. The load bearing device of claim 3, wherein the load bearing device has a serial number affixed to a load bearing connector.

5. The load bearing device of claim 3, wherein the second portion includes notch in the strand of wire form material.

6. The load bearing device of claim 3, wherein the second portion includes an opening in the strand of wire form material.

7. The load bearing device of claim 1, wherein the strand of wire form material is made of a steel material, including at least about 0.12% carbon, that is sufficiently heat treated to increase the tensile strength of the steel to meet government strength requirements in the United States for overhead chain lifting equipment.

8. A load bearing device calibrated to provide an indication of a load borne by the load bearing device that exceeds a load bearing capacity established for the load bearing device, the load bearing device comprising:

first and second load bearing connectors interconnected by an overload indicator; the overload indicator being calibrated to provide an indication of a load borne by the load bearing device that exceeds a load bearing capacity established for the load bearing device; the overload indicator including a quick link; the quick link including a strand of wire form material having first and second ends, the first and second ends defining a gap between the respective first and second ends; the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion; the second portion including a notch having a second thickness, the second thickness being less than the first thickness, wherein the second thickness is calibrated in such a manner as to establish a projected load, which, when borne by the overload indicator, will create a sufficient force to break the overload indicator proximate the notch.

9. The load bearing device of claim 8, further comprising a safety loop interconnecting the first and second load bearing connectors.

10. The load bearing device of claim 8, wherein the overload indicator has a serial number affixed to identify the overload indicator.

11. The load bearing device of claim 10, wherein the load bearing device has a serial number affixed to a load bearing connector.

12. The load bearing device of claim 8, wherein the strand of wire form material is made of a steel material, including at least about 0.12% carbon, that is sufficiently heat treated to increase the tensile strength of the steel to meet government strength requirements in the United States for overhead chain lifting equipment.

13. An overload indicator calibrated to provide an indication of a load borne by the overload indicator that exceeds a load bearing capacity established for the overload indicator, the overload indicator comprising:

a quick link; the quick link including a strand of wire form material having first and second ends, the first and second ends defining a gap between the respective first and second ends; the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion; the second portion including a diminished segment having a second amount of wire form material in a perpendicular cross-section passing Through a length of the strand which is less than the first amount of wire form material, wherein the second amount of wire form material is calibrated in such a manner as to establish a projected load, which, when borne by the overload indicator, will create a sufficient force to break the overload indicator proximate the diminished segment.

14. The overload indicator of claim 13, wherein the overload indicator has a serial number affixed to identify the overload indicator.

15. The overload indicator of claim 13, wherein the second portion includes a notch in the strand of wire form material.

16. The overload indicator of claim 13, wherein the second portion includes an opening in the strand of wire form material.

17. The overload indicator of claim 13, wherein the strand of wire form material is made of a steel material, including at least about 0.12% carbon, that is sufficiently heat treated to increase the tensile strength of the steel to meet government strength requirements in the United States for overhead chain lifting equipment.

18. An overload indicator calibrated to provide an indication of a load borne by the overload indicator that exceeds a load bearing capacity established for the overload indicator, the overload indicator comprising:

a quick link the quick link including a strand of wire form material having first and second ends, the first and second ends defining a gap between the respective first and second ends, the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion; the second portion including a notch having a second thickness, the second thickness being less than the first thickness, wherein the second thickness is calibrated in such a manner as to establish a projected load, which, when borne by the overload indicator, will create a sufficient force to break the overload indicator proximate the notch.

19. The overload indicator of claim 18, where the second portion includes a notch in the strand of wire form material.

20. The overload indicator of claim 18, wherein the strand of wire form material is made of a steel material, including at least about 0.12% carbon, that is sufficiently heat treated to increase the tensile strength of the steel to meet government strength requirements in the United States for overhead chain lifting equipment.

21. A method of making a load bearing device calibrated to provide an indication of a load borne by the loading bearing device that exceeds a load bearing capacity established for the load bearing device, the method comprising the steps of:
  1) providing an overload indicator; the overload indicator being calibrated to provide an indication of a load borne by the overload indicator that exceeds a load bearing capacity established for the overload indicator; the overload indicator including a quick link; the quick link including a strand wire form material having first and second ends, the first and second ends defining a gap between the respective first and second ends; the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion; the second portion including a diminished segment having a second amount of wire form material in a perpendicular cross-section passing through a length of the strand which is less than the first amount of wire form material, wherein the second amount of wire form material is calibrated in such a manner as to establish a projected load, which, when borne by the overload indicator, will create a sufficient force to break the overload indicator proximate the diminished segment;
  2) securing the overload indicator to first and second connectors of a load bearing device such that the overload indicator will provide an indication of a load borne by the load bearing device that exceeds a load bearing capacity established for the load bearing device.

22. The method of claim 21, further comprising the step of providing the load bearing device with a safety loop interconnecting the first and second load bearing connectors.

23. The method of claim 21, further comprising the step of providing the overload indicator with a serial number affixed to identify the overload indicator.

24. The method of claim 23, further comprising the step of providing the load bearing device with a serial number affixed to a load bearing connector.

25. The method of claim 21, wherein the step of providing an overload indicator includes providing a quick link including a strand of wire form material made of steel, including at least about 0.12% carbon, that is sufficiently heat treated to increase the tensile strength of the steel to meet government strength requirements in the United States for overhead chain lifting equipment.

26. A method of making an overload indicator for incorporation into a load bearing device to provide an indication of a load borne by the load bearing device that exceeds a load bearing capacity established for the load bearing device, the method comprising the steps of:
  1) providing a quick link; the quick link including a strand of wire form material having first and second ends, the first and second ends defining a gap between the respective first and second ends; the quick link further including a disconnectable connector connecting the first and second ends of the strand of wire form material to form a continuous loop when the connector is connected to each of the respective first and second ends; the strand of wire form material having a first portion having a first thickness containing a first amount of wire form material in a perpendicular cross-section passing through a length of the strand; the first portion being adjacent to a second portion having the same thickness;
  2) modifying the quick link by diminishing the amount of wire form material in the second portion so that the second portion includes a diminished segment having a second amount of wire form material in a perpendicular cross-section passing through a length of the strand which is less than the first amount of wire form material, wherein the second amount of wire form material is calibrated in such a manner as to establish a projected load, which, when borne by the second segment, will create a sufficient force to break the modified quick link proximate the diminished segment.

27. The method of claim 26, further comprising the step of providing the overload indicator with a serial number affixed to identify the overload indicator.

28. The method of claim 26, wherein the step of providing a quick link includes providing a quick link including a strand of wire form material made of steel, including at least about 0.12% carbon, that is sufficiently heat treated to increase the tensile strength of the steel to meet government strength requirements in the United States for overhead chain lifting equipment.

29. The method of claim 26, wherein the step of modifying the quick link includes creating an opening in the strand of wire form material by drilling through a portion of the strand.

30. The method of claim 26, wherein the step of modifying the quick link includes creating a notch in the strand of wire form material.

31. The method of claim 30, wherein the notch created in the strand of wire form material is selected from the group consisting of a rounded notch, a V-shaped notch and a saw cut notch.

* * * * *

UNITED STATES PATENT AND TRADEMARK OFFICE
CERTIFICATE OF CORRECTION

PATENT NO. : 7,032,466 B2
APPLICATION NO. : 10/460903
DATED : April 25, 2006
INVENTOR(S) : McCauley It is certified that error appears in the above-identified patent and that said Letters Patent is hereby corrected as shown below:

IN THE TITLE, On Title Page Item (54) Col. 1

Please delete "Overboard" and insert "Overload".

At Column 1, Line 36, delete "the" and insert therefore - -they- -

At Column 8, Line 47, delete "were" and insert therefor - -where- -

At Column 10, Line 9, delete "known" and insert therefore - -know- -

At Column 10, Line 22, delete "known" and insert therefore - -know- -

At Column 10, Line 48, delete "prevent" and insert therefore - -present- -

Signed and Sealed this

First Day of August, 2006

JON W. DUDAS
*Director of the United States Patent and Trademark Office*